(12) United States Patent
Baskaran et al.

(10) Patent No.: US 9,743,150 B2
(45) Date of Patent: Aug. 22, 2017

(54) METHOD, APPARATUS, AND SYSTEM FOR PROVIDING ELECTRONIC PROGRAM GUIDE CHANGES DURING OUTAGES IN A MEDIA STREAM

(71) Applicant: Verizon Patent and Licensing Inc., Arlington, VA (US)

(72) Inventors: Arjun Baskaran, Chennai (IN); Sankar Ram Dhanabalan, Irving, TX (US); Srirama R. Kalidindi, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 19 days.

(21) Appl. No.: 14/326,108

(22) Filed: Jul. 8, 2014

(65) Prior Publication Data
US 2016/0014464 A1 Jan. 14, 2016

(51) Int. Cl.
  *G06F 3/00* (2006.01)
  *G06F 13/00* (2006.01)
  *H04N 5/445* (2011.01)
  *H04N 21/488* (2011.01)
  *H04N 21/433* (2011.01)
  *H04N 21/442* (2011.01)
  *H04N 21/472* (2011.01)
  *H04N 21/482* (2011.01)

(52) U.S. Cl.
  CPC ..... *H04N 21/4882* (2013.01); *H04N 21/4334* (2013.01); *H04N 21/44209* (2013.01); *H04N 21/47214* (2013.01); *H04N 21/4821* (2013.01)

(58) Field of Classification Search
  CPC ......... H04N 21/4334; H04N 21/44209; H04N 21/4882; H04N 21/4821; H04N 21/47214; H04N 5/44543; H04N 21/482; H04N 21/84; H04N 21/4345
  USPC ............................................... 725/50, 51, 39
  See application file for complete search history.

(56) References Cited

U.S. PATENT DOCUMENTS

| | | | |
|---|---|---|---|
| 2003/0233451 A1* | 12/2003 | Ludvig | H04N 21/2221 709/225 |
| 2005/0120373 A1* | 6/2005 | Thomas | H04N 21/47214 725/58 |
| 2005/0278741 A1* | 12/2005 | Robarts | H04N 5/44543 725/46 |
| 2009/0077049 A1* | 3/2009 | Seet | G06F 17/3002 |
| 2009/0133074 A1* | 5/2009 | White | H04N 7/165 725/50 |

(Continued)

*Primary Examiner* — Nnenna Ekpo

(57) ABSTRACT

A method, apparatus, and system for providing improved EPGs are described. An availability, at a set-top box, of a media stream is determined, wherein the media stream includes one or more of a first plurality of programs associated with a subscriber. One or more electronic program guides indicating a second plurality of programs associated with the subscriber based on the availability of the media stream are accessed, wherein each of the second plurality of programs are accessible to the set-top box via a data stream that is separate from the media stream and the second plurality of programs includes at least one program of the first plurality of programs. Scheduling information associated with the one or more electronic program guides based on the availability of the media stream is retrieved via the data stream.

20 Claims, 12 Drawing Sheets

(56) References Cited

U.S. PATENT DOCUMENTS

| | | | |
|---|---|---|---|
| 2009/0319901 A1* | 12/2009 | Johnson | H04N 7/163 |
| | | | 715/722 |
| 2011/0007218 A1* | 1/2011 | Moran | H04H 20/106 |
| | | | 348/555 |
| 2013/0219435 A1* | 8/2013 | Pattison | H04N 21/4383 |
| | | | 725/68 |
| 2015/0095461 A1* | 4/2015 | McGowan | H04L 65/60 |
| | | | 709/219 |

* cited by examiner

400

METHOD, APPARATUS, AND SYSTEM FOR PROVIDING ELECTRONIC PROGRAM GUIDE CHANGES DURING OUTAGES IN A MEDIA STREAM

BACKGROUND INFORMATION

Set-top boxes and similar devices commonly provide television programs on a media stream from service providers using a coaxial or fiber-optic cable and notify end-users (e.g., subscribers) of the content using electronic program guides (EPGs). Such EPGs are typically configured to indicate every channel available to an end-user using the media stream. However, traditional EPGs fail to account for outages of programs in the media stream.

Therefore, there is a need for an approach to provide end-users with improved EPGs, particularly EPGs capable of indicating alternate programs available during outages in the media stream.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, user interface, and system for providing improved EPGs are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Figure 1:
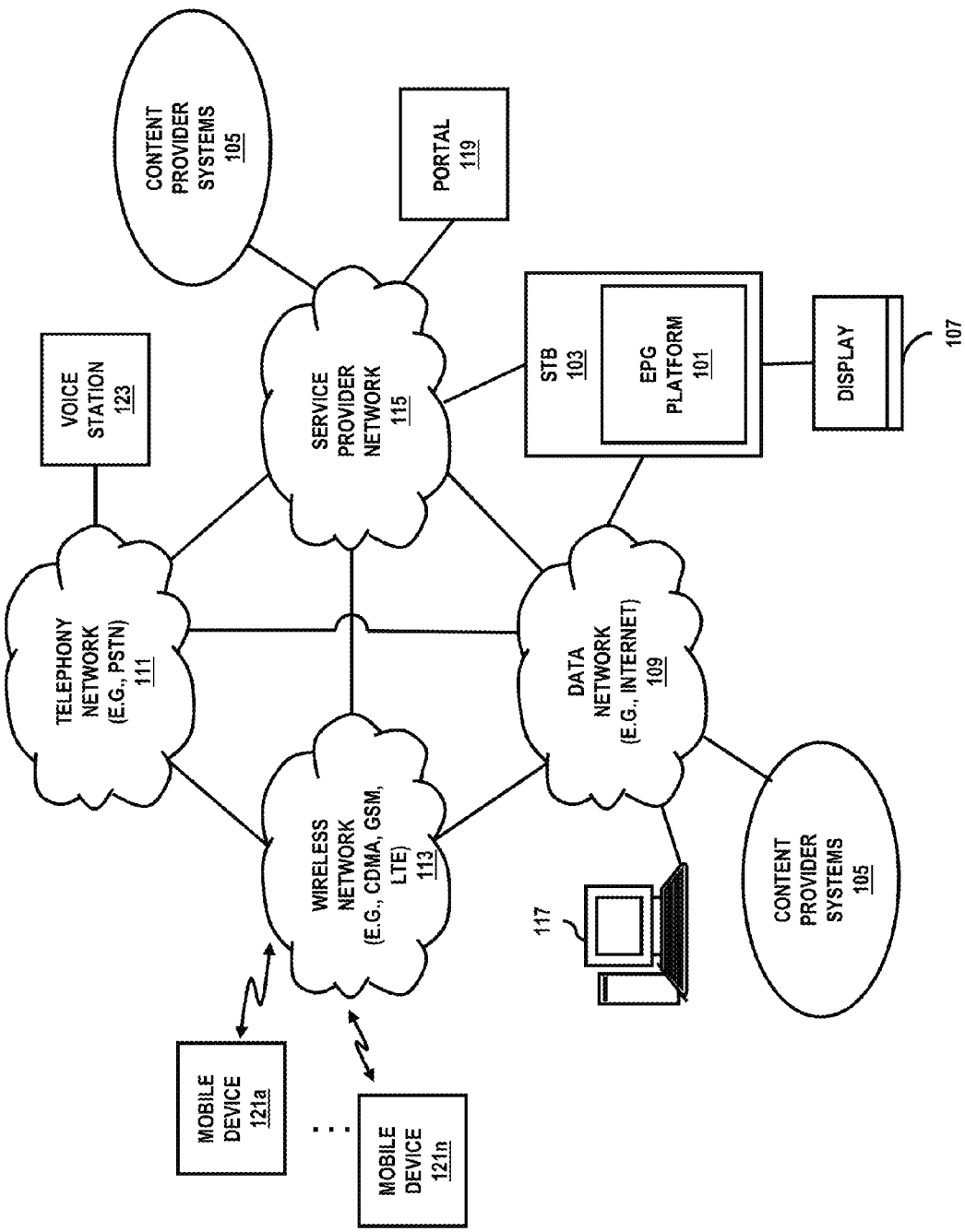
FIG. 1 is a diagram of a system capable of providing an improved EPG, according to one embodiment.

FIG. 1 is a diagram of a communication system capable of providing improved EPGs, according to various embodiments. For illustrative purposes, system 100 is described with respect to an EPG platform 101. In this example, the platform 101 is included in a set-top box 103 or other equivalent apparatus to provide improved EPGs. The platform 101 may be implemented in a set-top box 103 and have connectivity with to content provider systems 105, and display 107, using any form of communication, such as, for example, directly modulated carriers (e.g., national television systems committee (NTSC), advanced television systems committee (ATSC), quadrature amplitude modulation (QAM)), near field communication (NFC), a packet-based network (e.g., the Internet), BLUETOOTH, WIFI, and WIMAX.

As mentioned, traditional EPGs may fail to account for outages of programs in a media stream (e.g., directly modulated carriers). Frequently, EPGs of such set-top boxes assume full availability of all programs and channels subscribed to by end-users. As such, EPGs may indicate programs not currently accessible to end-users. Furthermore, many traditional EPGs may be configured to access some programs and channels subscribed to end-users when a primary source of media (e.g., media stream) is unavailable. For instance, a set-top box may be configured to access programs via a secondary source (e.g., a data stream). However, traditional EPGs may be unable to direct an end-user to alternative sources of media content, for instance, by indicating a remote data store for retrieving the program. Furthermore, in some cases, program outages may be the result of restarting or rebooting of the set-top box. For example, many set-top boxes include mechanisms that require a long (e.g., minutes) restart time, thereby resulting in significant service outages to end-users even when such outages are temporary (e.g., 30 seconds). As such, there is further need for EPGs that quickly (e.g., real time) direct end-users to alternate sources of media during media stream outages.

Therefore, there is a need for an approach to provide improved EPGs. By way of example, the set-top box 103 may be configured to direct end-users watching a particular program on a media stream to the particular program via a data connection when the media stream becomes unavailable. In another example, the set-top box 103 is configured to suggest live programs available on a data connection to end-users while a media stream is repaired by a service provider.

To address this issue, the system 100 of FIG. 1 introduces a capability to modify and/or generate an EPG based on an availability of a media stream. In some embodiments, the EPG is further based on scheduling information that may indicate, for instance, channels and/or programs available, and/or access information indicating a location on a remote datastore (e.g., uniform resource locator (URL)). Additionally, or alternatively, EPG data (e.g., EPG slice files) of a first EPG for a media stream is modified and/or used in a second EPG for a media stream, thereby allowing for EPGs to be modified or generated in real or near-real time.

Although various exemplary embodiments are described with respect to set-top box 103, it is contemplated that these embodiments have applicability to any device capable of processing audio-video (AV) signals for presentation to a user, such as a home communication terminal (HCT), a digital home communication terminal (DHCT), a stand-alone personal video recorder (PVR), a television set, a digital video disc (DVD) player, a video-enabled phone, an AV-enabled personal digital assistant (PDA), and/or a personal computer (PC), as well as other like technologies and customer premises equipment (CPE). Furthermore, although the set-top box is explained in the context of playback of visual media (e.g., TV shows, movies, news, sporting events, etc.), it is contemplated that other media relating to various sources and types (e.g., audio books, cached web pages, web cast, etc.) are applicable.

In one embodiment, the platform 101 has access to one or more networks, such as the data network 109, the telephony network 111, and/or the wireless network 113, may interact with the service provider network 115.

In certain embodiments, users (e.g., subscribers) may utilize a computing device 117 (e.g., laptop, desktop, web appliance, netbook, etc.) to access platform 101 via service provider portal 119. Service provider portal 119 provides, for example, a web-based user interface to allow users to access the services of platform 101.

According to one embodiment, improved EPGs may be part of managed services supplied by a service provider as a hosted or subscription-based service made available to users of the set-top box 103 through a service provider network 115. As shown, platform 101 may be a part of or connected to the service provider network 115. According to another embodiment, at least a portion of platform 101 may be included within or connected to the mobile devices 121.

As used herein, mobile devices 121 may be any type of mobile terminal including a mobile handset, mobile station, mobile unit, multimedia computer, multimedia tablet, communicator, netbook, Personal Digital Assistants (PDAs), smartphone, media receiver, etc. It is also contemplated that the mobile devices 121 may support any type of interface for supporting the presentment or exchange of data. In addition, mobile devices 121 may facilitate various input means for receiving and generating information, including touch screen capability, keyboard and keypad data entry, voice-based input mechanisms, accelerometer (e.g., shaking the mobile device 121), and the like. Any known and future implementations of mobile devices 121 are applicable. It is noted that, in certain embodiments, the mobile devices 121 may be configured to transmit information (e.g., audio signals, words, address, etc.) using a variety of technologies—e.g., NFC, BLUETOOTH, infrared, etc. Also, connectivity may be provided via a wireless local area network (LAN). By way of example, a group of mobile devices 121 may be configured to a common LAN so that each device can be uniquely identified via any suitable network addressing scheme. For example, the LAN may utilize the dynamic host configuration protocol (DHCP) to dynamically assign "private" DHCP internet protocol (IP) addresses to each mobile device 121, e.g., IP addresses that are accessible to devices connected to the service provider network 115 as facilitated via a router.

In some embodiments, platform 101, the set-top box 103, and other elements of the system 100 are configured to communicate with content provider systems 105. The content provider systems 105 may include media or programming content, such as, for instance, audio-visual content (e.g., broadcast television programs, video-on-demand programs, pay-per-view programs, internet protocol television feeds, DVD related content, etc.), pre-recorded media content, data communication services content (e.g., commercials, advertisements, videos, movies, songs, images, sounds, etc.), Internet services content (streamed audio, video, or pictographic media), and/or any other equivalent media form. In this manner, the set-top box 103 may provide (in addition to the end-users own content) content obtained from other sources, such as one or more television broadcast systems, one or more third-party content provider systems, as well as content available via one or more packet-based networks 109 or telephony networks 111, etc.

In some embodiments, platform 101, the mobile devices 121, the set-top box 103, and other elements of the system 100 may be configured to communicate via the service provider network 115. According to certain embodiments, one or more networks, such as the data network 109, the telephony network 111, and/or the wireless network 113, may interact with the service provider network 115. The networks 109-115 may be any suitable wireline and/or wireless network, and be managed by one or more service providers. For example, the data network 109 may be any local area network (LAN), metropolitan area network (MAN), wide area network (WAN), the Internet, or any other suitable packet-switched network, such as a commercially owned, proprietary packet-switched network, such as a proprietary cable or fiber-optic network. For example, computing device 117 may be any suitable computing device, such as a VoIP phone, skinny client control protocol (SCCP) phone, session initiation protocol (SIP) phone, IP phone, personal computer, softphone, workstation, terminal, server, etc. The telephony network 111 may include a circuit-switched network, such as the public switched telephone network (PSTN), an integrated services digital network (ISDN), a private branch exchange (PBX), or other like network. For instance, voice station 123 may be any suitable plain old telephone service (POTS) device, facsimile machine, etc. Meanwhile, the wireless network 113 may employ various technologies including, for example, code division multiple access (CDMA), long term evolution (LTE), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like.

Although depicted as separate entities, the networks 109-115 may be completely or partially contained within one another, or may embody one or more of the aforementioned infrastructures. For instance, the service provider network 115 may embody circuit-switched and/or packet-switched networks that include facilities to provide for transport of circuit-switched and/or packet-based communications. It is further contemplated that the networks 109-115 may include components and facilities to provide for signaling and/or bearer communications between the various components or facilities of the system 100. In this manner, the networks 109-115 may embody or include portions of a signaling system 7 (SS7) network, Internet protocol multimedia subsystem (IMS), or other suitable infrastructure to support control and signaling functions.

While specific reference will be made thereto, it is contemplated that the system 100 may embody many forms and include multiple and/or alternative components and facilities.

Figure 2:
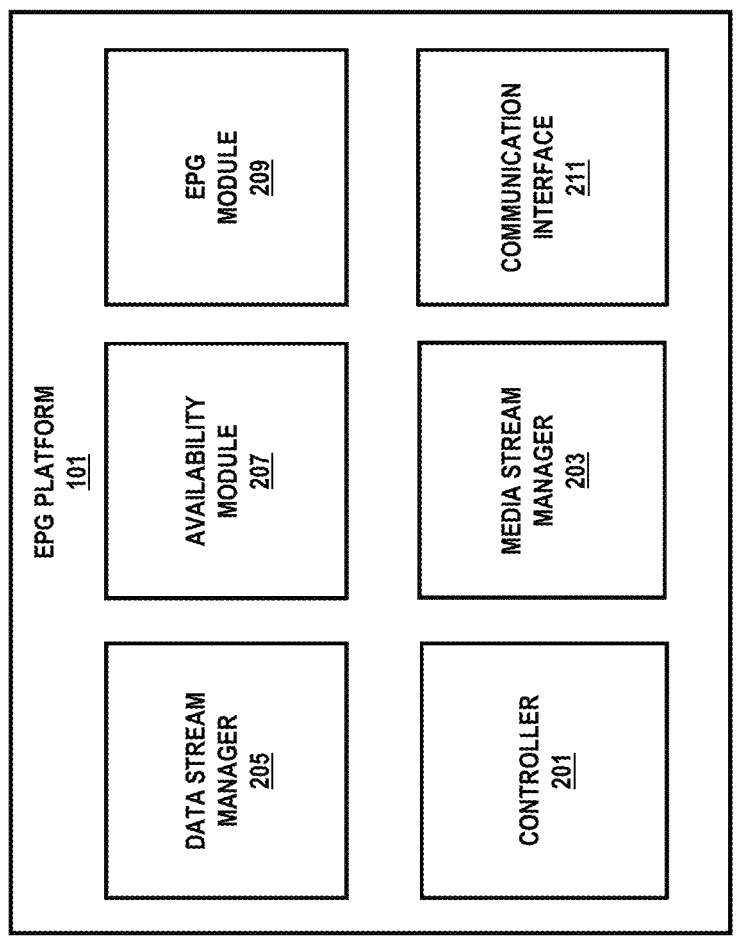
FIG. 2 is a diagram of the components of an improved EPG platform, according to one embodiment.

FIG. 2 is a diagram of the components of platform 101, according to one embodiment. The platform 101 may comprise computing hardware (such as described with respect to FIGS. 11 and 12), as well as include one or more components configured to execute the processes described herein. It is contemplated that the functions of these components may be combined in one or more components or performed by other components of equivalent functionality. In one implementation, platform 101 includes a controller 201, media stream manager 203, data stream manager 205, availability module 207, EPG module 209, and communication interface 211.

The controller 201 may execute at least one algorithm for executing functions of platform 101. For example, the controller 201 may interact with the media stream manager 203 and data stream manager 205 to determine channels available to an end-user using a media stream and data stream, respectively. The controller 201 may interact with availability module 207 and EPG module 209 to determine an availability of a media stream and cause a retrieving of scheduling information for an EPG.

The media stream manager 203 determines channels of programs available to an end-user using a media stream. In one embodiment, the media stream manager 203 determines channels and programs accessible to an end-user based on a subscription, parental settings, and the like. For instance, subscribed channels that are not indicated as blocked by a parental setting are included in an EPG. Furthermore, a regional identifier may be used to determine channels/programs accessible to an end-user. In some embodiments, the media stream manager 203 determines recorded shows, widgets, on-demand, pay-per-view, and other media content available via the media stream and indicates such content in the EPG.

As used herein, media stream indicates a primary source of media content. In one embodiment, the media stream is encrypted media content transmitted using a radio frequency signal on a coaxial or fiber-optic cable. Additionally, or alternatively, the media stream is transmitted utilizing directly modulated carriers (e.g., national television systems committee (NTSC), advanced television systems committee (ATSC), quadrature amplitude modulation (QAM)), and the like. The media stream may be provided from a service provider network and utilize a digital living network alliance (DLNA) server. In some embodiments, a TV tuner is used to separate a particular channel of a media stream from other channels of the media stream.

The data stream manager 205 determines channels of programs accessible to an end-user using a data stream. The data stream manager 205 may determine scheduling information that includes access information indicating a remote data store (e.g., URL). Similar to the media stream manager 203, the data stream manager 205 may determine channels and programs accessible to an end-user based on a subscription, parental settings, a regional identifier, and the like. For instance, subscribed channels that are not indicated as blocked by a parental setting are included in an EPG. It is noted that some channels and/or programs accessible via the media stream may not be accessible via the data stream. Additionally, only live content may be accessible via the data stream. Furthermore, recorded shows, widgets, on-demand, pay-per-view, and other media content available via the media stream may be unavailable via the data stream.

As used herein, data stream refers to a secondary source of media content. In one embodiment, the data stream uses a packet-based network configured for bulk data transfers. Additionally, various compression methods and standards may be used, for instance, MPEG2 and/or MPEG 4. Furthermore, the data stream may include use of a wireless network (e.g., WiMAX, WiFi, etc.) and wired networks (e.g., RJ45). The data stream may be provided directly from a service provider network or from the service provider network via a packet-based network (e.g., the Internet). Additionally, the data stream may be delivered using end-to-end data encryption in conjunction with streaming services. In some embodiments, the data stream accesses a remote datastore utilizing internet protocols, such as for instance, a URL, web address, uniform source identifier, international resource identifier, and the like. Furthermore, some media content of the media stream may be unavailable. For instance, the data stream may include live media content of the media stream and exclude one or more of recorded shows, widgets, on-demand, and pay-per-view content.

The availability module 207 determines an availability, at a set-top box (e.g., 103), of a media stream. The availability module 207 may additionally determine an availability at a set-top box, of a data stream. For instance, the availability module 207 determines a media stream to be unavailable when the data stream is determined to have a low signal strength (e.g., below a threshold), high error rate (e.g., above a threshold), and the like. The availability module 207 may identify a particular set-top box and/or end-user using a unique set-top box indicator, such as a serial number, IP client indicator, regional identifier, and the like. Similarly, the availability module 207 may be configured to determine a restoration, at a set-top box (e.g., 103), of a media stream. For instance, the availability module 207 determines a media stream to be restored when the data stream is determined to have a high signal strength (e.g., above a threshold), low error rate (e.g., below a threshold), and the like.

The EPG module 209 maintains one or more EPGs. For instance, the EPG module 209 maintains in a cache of a set-top box EPG slice files indicating programs for channels. It is noted that in some cases (e.g., cold boot-up), the EPG module 209 fetches all the EPG slice files, while in other cases (e.g., loss of media content during normal operation) the EPG module 209 utilizes one or more EPG slice files previously stored in the cache of the set-top box. Furthermore, the EPG module may associates particular channels (and programs) with the media stream, the data stream, or both. As such, an EPG slice file may be used to present a first EPG having channels available on a media stream and used to present a second EPG having channels available on a data stream.

In some embodiments, the EPG module 209 associates access information with channels (and programs) of an EPG and/or EPG slice file(s). For instance, the EPG module 209 may associate a particular URL with each program of an EPG. In another Example, the EPG module 209 associates a particular URL with each program of an EPG slice file, by, for instance, appending the URLs into the EPG slice file. In one embodiment, the EPG module 209 determines a time range for an EPG based on a cache of a set-top box. For instance, the EPG module 209 determines a number of EPG slice files to store in the cache based on a remaining capacity of the cache, and accordingly selects a time range (e.g., two-week starting from a current time).

The platform 101 may further include a communication interface 211 to communicate with other components of platform 101, the mobile devices 121, and other components of the system 100. The communication interface 211 may include multiple means of communication. For example, the communication interface 211 may be able to communicate using a the data stream, media stream, and various other types of communication, such as, for instance, over short message service (SMS), multimedia messaging service (MMS), instant messaging, voice sessions (e.g., via a phone network), e-mail, NFC, and QR code. Additionally, communication interface 211 may include a web portal (e.g., service provider portal 119) accessible by, for example, mobile device 121, set-top box 103, computing device 117, and the like.

It is contemplated that to prevent unauthorized access, platform 101 may include an authentication identifier when transmitting signals to and from mobile devices 121 and to and from set-top box 103. For instance, control messages may be encrypted, either symmetrically or asymmetrically, such that a hash value can be utilized to authenticate received control signals, as well as ensure that those signals have not been impermissibly alerted in transit. As such, communications between the mobile devices 121 and platform 101 and between set-top box 103 and platform 101 may include various identifiers, keys, random numbers, random handshakes, digital signatures, and the like.

Figure 3:
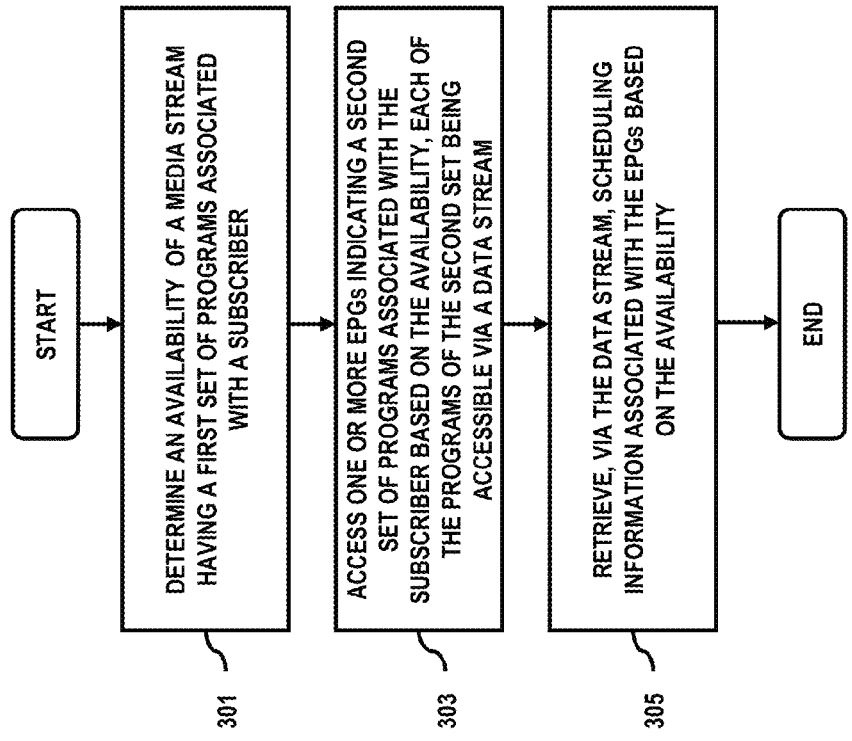
FIG. 3 is a flowchart of a process for providing an improved EPG, according to one embodiment.
Figure 11:
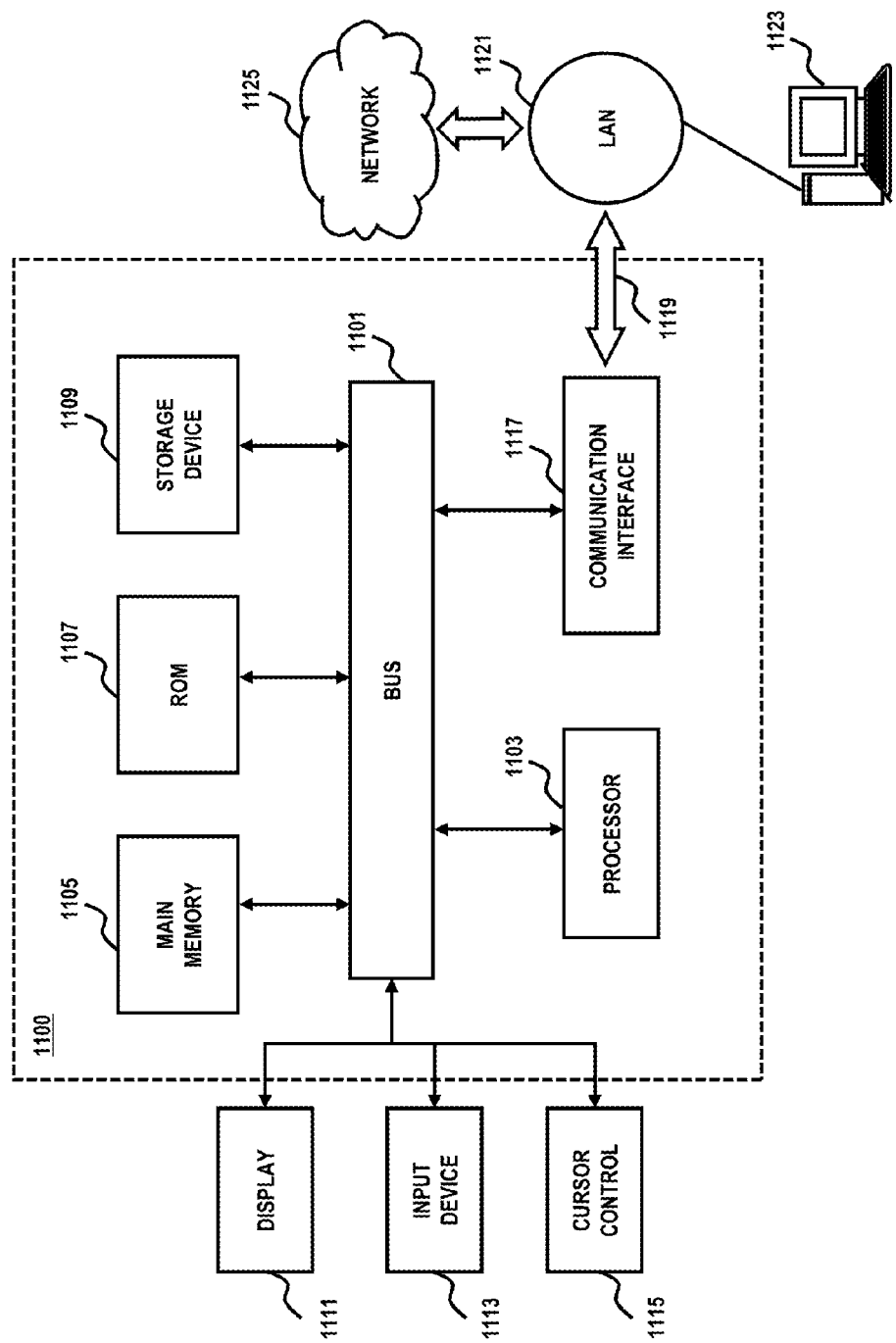
FIG. 11 is a diagram of a computer system that can be used to implement various exemplary embodiments.
Figure 12:
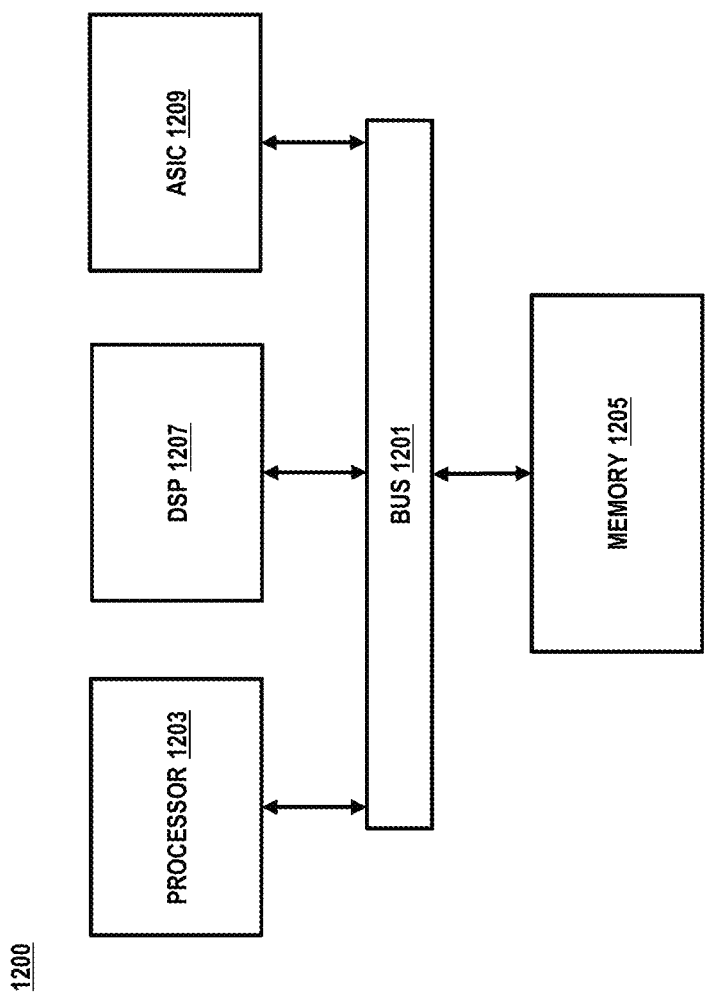
FIG. 12 is a diagram of a chip set that can be used to implement various exemplary embodiments.

FIG. 3 is a flowchart of a process for providing an improved EPG, according to one embodiment. By way of example, process 300 is explained with respect to system 100 of FIG. 1, and platform 101 of FIG. 2. Also, process 300 may be implemented in, for instance, a chip set including a processor and a memory as shown in FIGS. 11 and 12.

In step 301, the availability module 207 determines an availability of a media stream having a first set of programs associated with a subscriber. For example, the availability module 207 determines a media stream to be unavailable when an error detecting code determines that a received (decoded) signal on a media stream exceeds a threshold.

Next in step 303, the EPG module 209 accesses one or more EPGs indicating a second set of programs associated with the subscriber based on the availability, each of the programs of the second set being accessible via a data stream. In one embodiment the media stream and data stream are separate. For instance, the data stream is connected to a gateway using a wireless data connection (e.g., WiFi) and the media stream is connected to the gateway using a coaxial cable. Additionally, or alternatively, the data stream is provided by a service provider using a packet-based network (e.g., internet protocol) and the media stream is provided using a quadrature amplitude modulation scheme. In one embodiment, at least one channel (and program) is included in both the first and second sets. For instance, a particular channel may be accessible via the media and data stream and therefore is included in both the first and second sets. In another example, a particular channel or program is only accessible via the media stream and is therefore omitted from the second set.

The communication interface 211 then retrieves, as in step 305, via the data stream, scheduling information associated with the EPGs based on the availability. For instance, the communication interface 211 accesses the service provider network 115 via the data network 109 using a universal unique identifier (UUID) or a regional identifier and retrieves scheduling information from the service provider network 115. In one embodiment, the scheduling information includes access information (e.g., URL) indicating a remote data store that is part of, for instance, the service provider network 115, data network 109, content provider systems 105, and the like.

Figure 4:
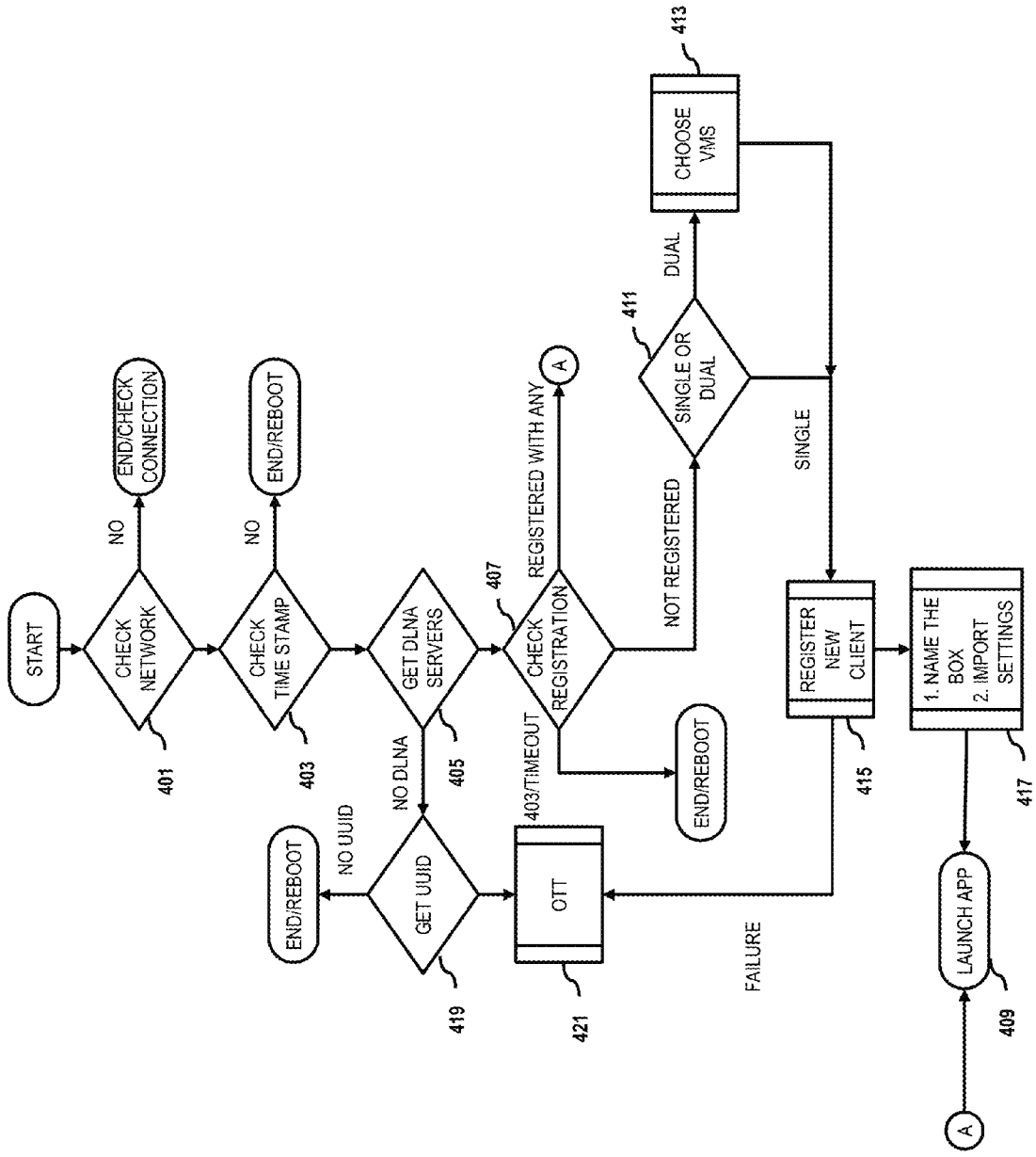
FIG. 4 is a detailed flowchart of a process for providing an improved EPG, according to one embodiment.

FIG. 4 is a detailed flowchart of a process for providing an improved EPG, according to one embodiment. By way of example, process 400 is explained with respect to system 100 of FIG. 1, and the platform 101 of FIG. 2. Also, process 400 may be implemented in, for instance, a chip set including a processor and a memory as shown in FIGS. 11 and 12.

In step 401, the availability module 207 checks a network connectivity of a set-top box 103, if no connectivity is detected then the process 400 ends. If network connectivity is detected, then the availability module 207 checks a time stamp (step 403) and attempts to get DLNA servers (step 405). If a DLNA server is available, process 400 checks registration (step 407). If the set-top box 103 is registered with any available DLNA server the process 400 launches the application (step 409). If the set-top box 103 is not registered with any DLNA server, the process 400 determines, in step 411, whether the set-top box 103 has access to a single or dual video media server (VMS), chooses a VMS in step 413 when the set-top box 103 has access to a dual VMS, and registers as a new client in step 415. The process 400 names the set-top box 103 and imports settings (step 417) and launches the application (step 409).

If no DLNA server is found in step 405, the process 400 attempts to get, in step 419, a UUID from the set-top box 103. If the process 400 is unable to get the UUID the process ends. If the process 400 gets the UUID, then an over-the-top (OTT) mode of the set-top box 103 is initiated (step 421). In one embodiment, the OTT mode utilizes a data stream to obtain media content during an outage of the DLNA server (e.g., media stream).

Figure 5:
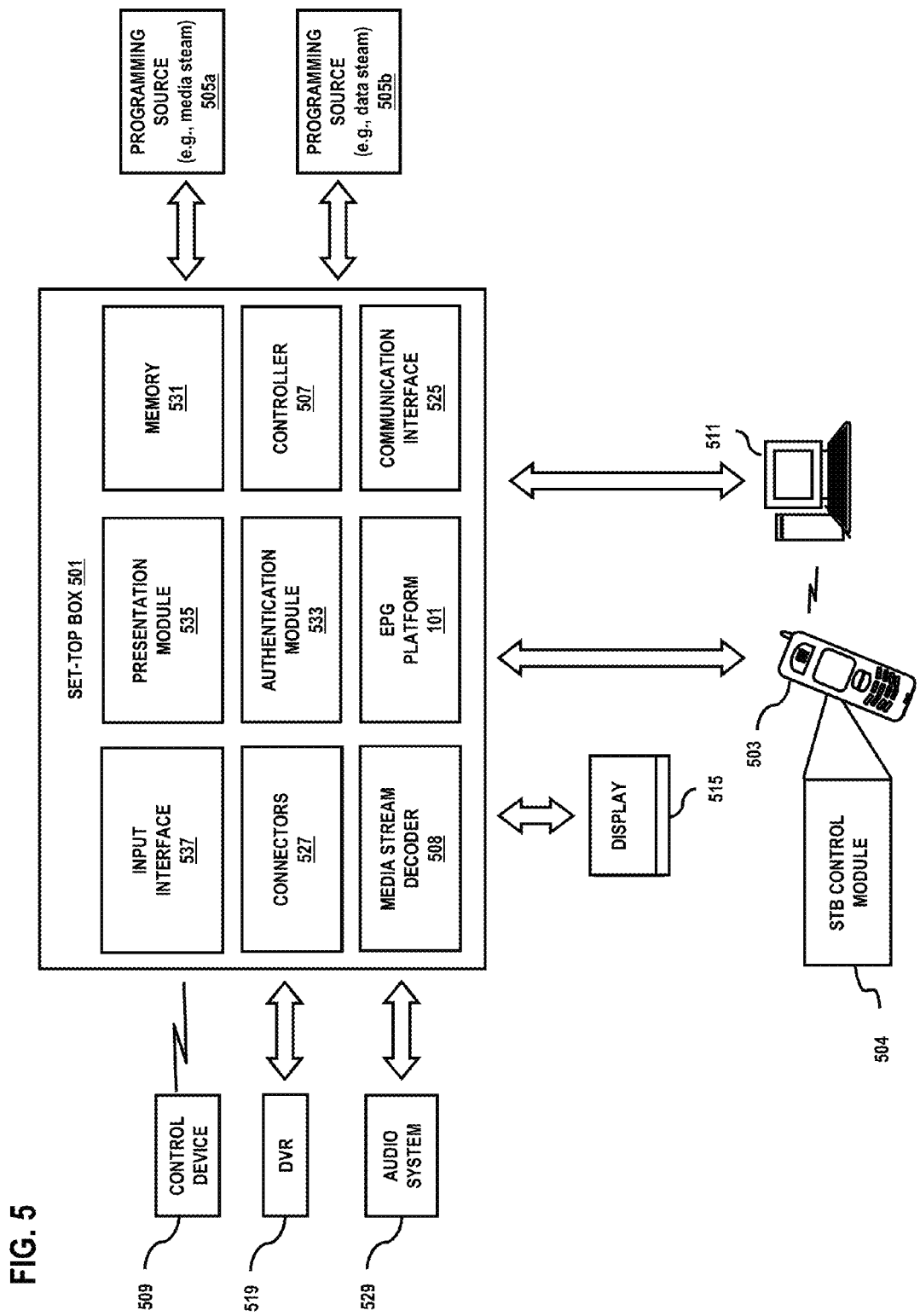
FIG. 5 is a diagram of a set-top box configured to provide an improved EPG, according to one embodiment.

FIG. 5 is a diagram of a set-top box configured to provide an improved EPG, according to an exemplary embodiment. In one embodiment, set-top box 501 may utilize any suitable technology to receive media from user device 503 (e.g., mobile phone), as well as one or more media (or content) streams from, for example, content provider systems 105 of FIG. 1. In this example, user device 503 includes a set-top box control module 504 to generate and forward sensor events to set-top box 501. Set-top box control module 504 communicates with various sensors (e.g., a gyroscope, accelerometer, light sensor, proximity sensor, temperature sensor, pressure sensor, or magnetic sensor) of user device 503. As shown, the set-top box 501 comprises one or more modules of the platform 101.

Set-top box 501 may comprise computing hardware (such as described with respect to FIGS. 11 and 12) and include additional components configured to provide services. In addition, set-top box 501 includes hardware and/or other components to support related functions and capabilities for viewing video assets (e.g., remote control capabilities, conditional access functions, tuning functions, presentation functions, multiple network interfaces, audio/video signal ports, etc.). As shown in FIG. 5, the functions and operations of set-top box 501 may be governed by a controller 507, which interacts with a media stream decoder 508. Additionally, controller 507 interacts with each of the set-top box components to provide programming guide information (e.g., EPG) and related content retrieved from an audio or video-sharing site, as well as from another set-top box device or component of system 100. In turn, the user may be afforded greater functionality utilizing a control device 509 to control the personalized programming guide service and related services, as will be more fully described below.

Set-top box 501 may be configured to communicate with a number of user devices, including: a PC 511, laptops, PDAs, cellular phones (e.g., device 503), mobile devices, handheld devices, as well as any other equivalent technology capable of capturing and storing media.

As such, set-top box 501 may be configured to provide an indicator that the set-top box 501 is being controlled by the mobile unit 503 on (or at) display 515. In one embodiment, presentation of the media information (or content) may include: displaying, recording, playing, rewinding, forwarding, toggling, selecting, zooming, or any other processing technique that enables users to manipulate the media. For instance, set-top box 501 may provide one or more signals to the display 515 (e.g., television) so that the display 515 may present the media, as images, audio, video, or any combination thereof. A communication interface (not illustrated) of PC 511 may be configured to retrieve the programming and content information over the data network (e.g., data network 109), wherein set-top box 501 may receive a programming content stream from PC 511 to present to the user via display 515.

Set-top box 501 may also interact with a PVR, such as digital video recorder (DVR) 519, to store received content that can then be manipulated by a user at a later point in time. In various embodiments, DVR 519 may be network-based, e.g., included as a part of the service provider network 115, collocated at a subscriber site having connectivity to set-top box 501, and/or integrated into set-top box 501.

Furthermore, set-top box 501 may include a communication interface 525 configured to receive content streams from a programming service provider 505a, PC 511, server (not shown), or other programming content source, such as programming service provider 505b (e.g., 125). Communication interface 525 may optionally include single or multiple port interfaces. For example, set-top box 501 may establish a broadband connection to multiple sources transmitting content to set-top box 501 via a single port, whereas in alternative embodiments, multiple ports may be assigned to the one or more sources. In still other embodiments, communication interface 525 may be configured to permit users, via set-top box 501, to transmit data (including media content) to other users with set-top boxes, a programming service provider 115, or other content source/sink.

According to various embodiments, set-top box 501 may also include inputs/outputs (e.g., connectors 527) to display 515 and DVR 519, as well as an audio system 529. In particular, audio system 529 may comprise a conventional audio-video receiver capable of monaural or stereo sound, as well as multichannel surround sound. Audio system 529 may include speakers, ear buds, headphones, or any other suitable component configured for personal or public dissemination. As such, set-top box 501, display 515, DVR 519, and audio system 529, for example, may support high resolution audio and/or video streams, such as high definition television (HDTV) or digital theater systems high definition (DTS-HD) audio. Thus, set-top box 501 may be configured to encapsulate data into a proper format with required credentials before transmitting onto one or more of the networks of FIG. 1 and de-encapsulate incoming traffic to dispatch data to display 515 and/or audio system 529.

In an exemplary embodiment, display 515 and/or audio system 529 may be configured with internet protocol (IP) capability (e.g., includes an IP stack, or is otherwise network addressable), such that the functions of set-top box 501 may be assumed by display 515 and/or audio system 529. In this manner, an IP ready, HDTV display or DTS-HD audio system may be directly connected to one or more service provider networks 115, packet-based networks (e.g., 109), and/or telephony networks 111. Although set-top box 501, display 515, DVR 519, and audio system 529 are shown separately, it is contemplated that these components may be integrated into a single component, or other combination of components.

Authentication module 533 with set-top box 501 may also be responsible for detecting and authenticating one or more user devices 503. Additionally, authentication module 533 may be provided to initiate or respond to authentication schemes of, for instance, service provider network 115 or various other content providers, e.g., broadcast television systems, (third-party) content provider systems 105. Authentication module 533 may provide sufficient authentication information, e.g., a user name and password, a key access number, a unique machine identifier (e.g., MAC address), and the like, as well as combinations thereof, to a corresponding network interface for establishing connectivity. As described earlier, one or more digital certificates may be simultaneously mapped. Moreover, authentication at set-top box 501 may identify and authenticate a second device (e.g., PC 511) communicatively coupled to, or associated with, set-top box 501, or vice versa. Further, authentication information may be stored locally at memory 531, in a repository (not shown) connected to set-top box 501, or at a remote repository, e.g., a user profile repository.

Authentication module 533 may also facilitate the reception of data from single or disparate sources. For instance, set-top box 501 may receive broadcast video from a first source (e.g., program service provider), signals from a second source, and a programming content stream from a third source accessible over a data network. As such, display 515 may present the broadcast video and programming content stream to the user. This presentation may be experienced separately, concurrently, in a toggled fashion, or with zooming, maximizing, minimizing, or trick capabilities, or equivalent mode.

Connector(s) 527 may provide various physical interfaces to display 515, audio system 529, as well as other peripherals; the physical interfaces may include, for example, RJ45, RJ11, high definition multimedia interface (HDMI), optical, coax, FireWire®, wireless, and universal serial bus (USB), or any other suitable connector. The presentation module 535 may also interact with a control device 509 for determining particular media content that a user desires to experience. In an exemplary embodiment, the control device 509 may comprise a remote control (or other access device having control capability, such as a PC 511, wireless device, mobile phone, etc.) that provides a user with the ability to readily manipulate and dynamically change parameters affecting the device event-based set-top box control service. In other examples, set-top box 501 may be configured for voice recognition such that set-top box 501 may be controlled with spoken utterances.

In addition to the user device 503 being configured to control the manner in which set-top box 501 behaves in response to device events, set-top box 501 may also permit control device 509 to activate and deactivate the device event-based set-top box control service. In this manner, control device 509 may include (not shown) a cursor controller, trackball, touch screen, touch pad, keyboard, and/or a key pad for activating a slideshow application, selecting programming content, as well as performing other control functions. Control device 509 may also include functional actuators (e.g., buttons, keys, icons, etc.), such as power on/of, play, pause, stop, fast-forward, reverse, volume up/down, channel up/down, menu, ok/enter, record, info, my content, search, edit, or exit, as well as any other suitable control trigger, such as alphanumeric buttons, shift, control, back, symbols, and the like.

Further, the control device 509 may comprise a memory (not illustrated) for storing preferences relating the device event-based set-top box control service; such preferences can be conveyed to set-top box 501 through an input interface 537. The input interface 537 may support any type of wired and/or wireless link, e.g., infrared, radio frequency (RF), BLUETOOTH™, and the like. Thus, control device 509 may store user preferences with respect to the parameters associated with the device event-based set-top box control service. Alternatively, user preferences may be tracked, recorded, or stored in set-top box 501 or in a network user profile repository. The preferences may be automatically retrieved and activated by a user at any time. It is noted that the control device 509 may be separate from set-top box 501 or may be integrated within set-top box 501 (in which case certain input interface hardware and/or software may not be necessary).

Figure 6:
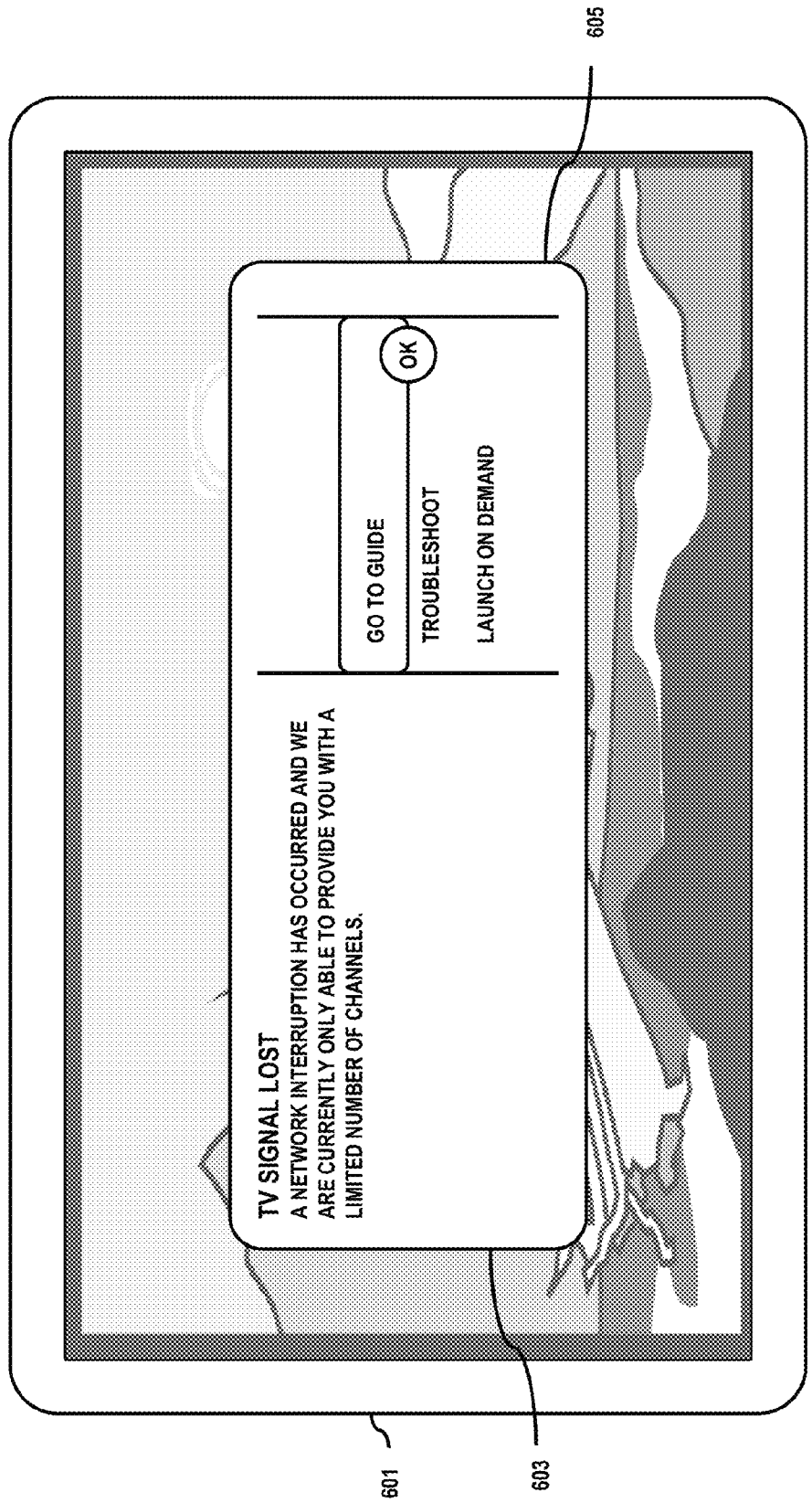
FIGS. 6 through 10 are diagrams of a graphical user interface (GUI) presented via a set-top box for providing an improved EPG, according to one embodiment.

FIG. 6 is a diagram of a graphical user interface (GUI) presented via a set-top box for providing an improved EPG, according to one embodiment. GUI 600 may be evoked, for instance, when availability module 207 determines an unavailability of media content at the set-top box 103. As shown, a screen 601 includes panel 603 notifying that a TV signal is lost and that a limited number of channels is available (e.g., via a media stream) and a panel 605 including selectable options to "go to guide," "troubleshoot," and "launch on demand."

Figure 7:
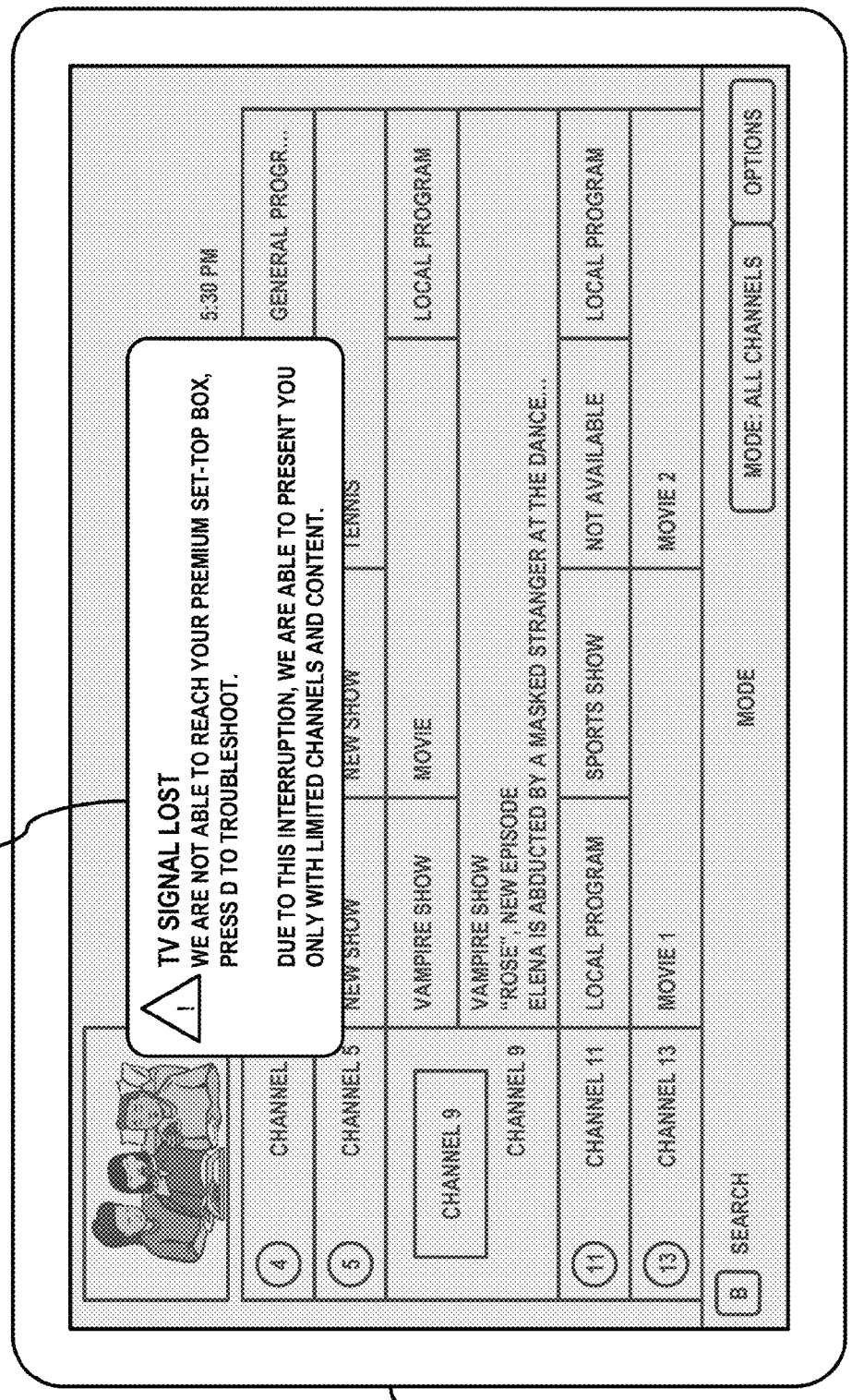
Figure 8:
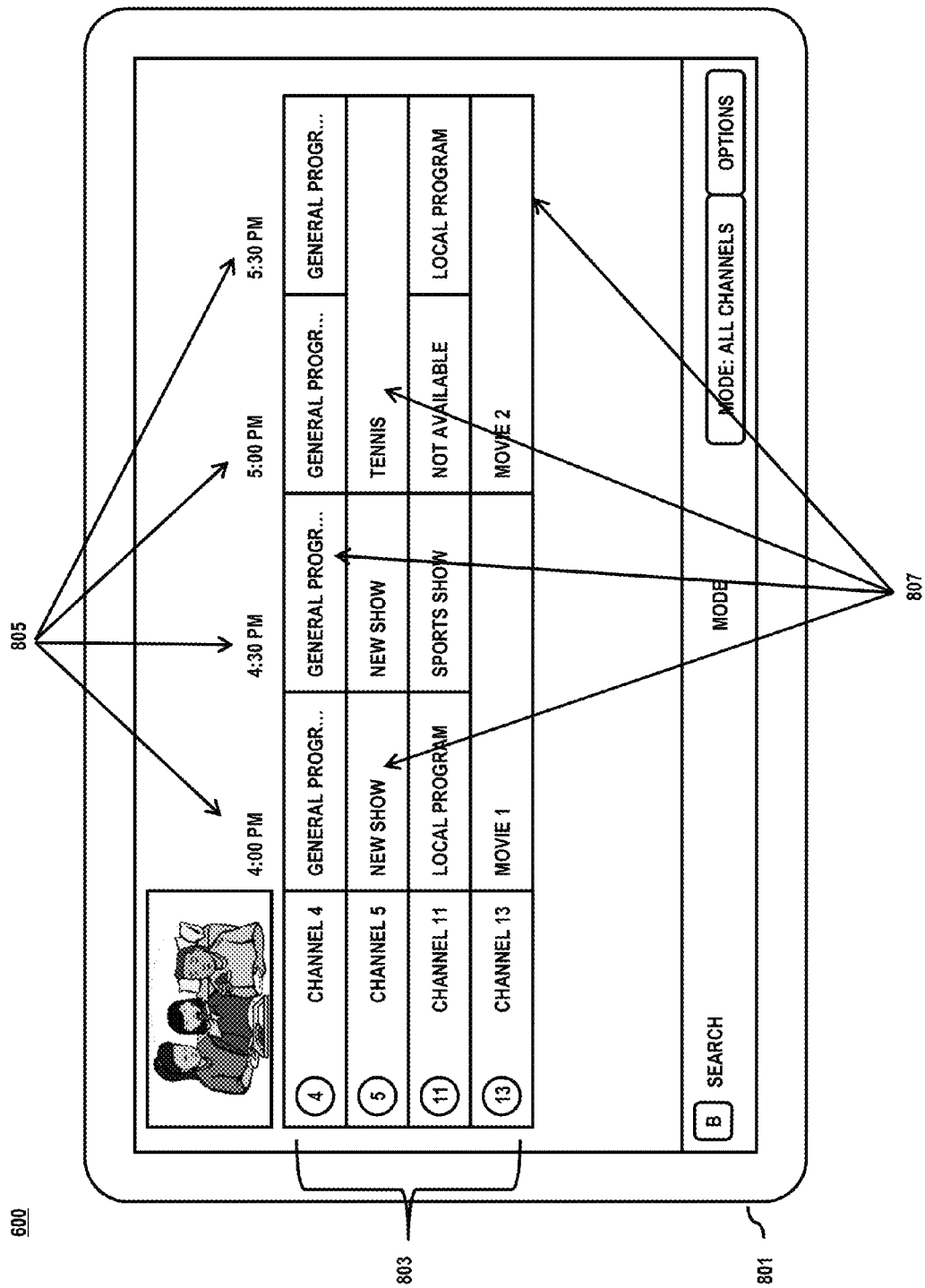

As shown in FIG. 7, screen 701 may be presented when "go to guide" of the selectable option on panel 605 is selected. The screen 701 includes a message box 703 indicating that a TV signal is lost and that a limited number of channels are available. Upon detecting a dismissal of the message box 703, for instance, by an interaction with control device 509, screen 801 of FIG. 8 is displayed. It is contemplated that the platform 101 may be configured to allow FIG. 8 to be displayed in real-time to minimize an interruption of services experienced by end-users. As shown, the screen 801 illustrates an exemplary EPG that indicates channels 803, time slots 805, and programs 807 of the channels 803 among the time slots 805 which are accessible via a data stream.

Figure 9:
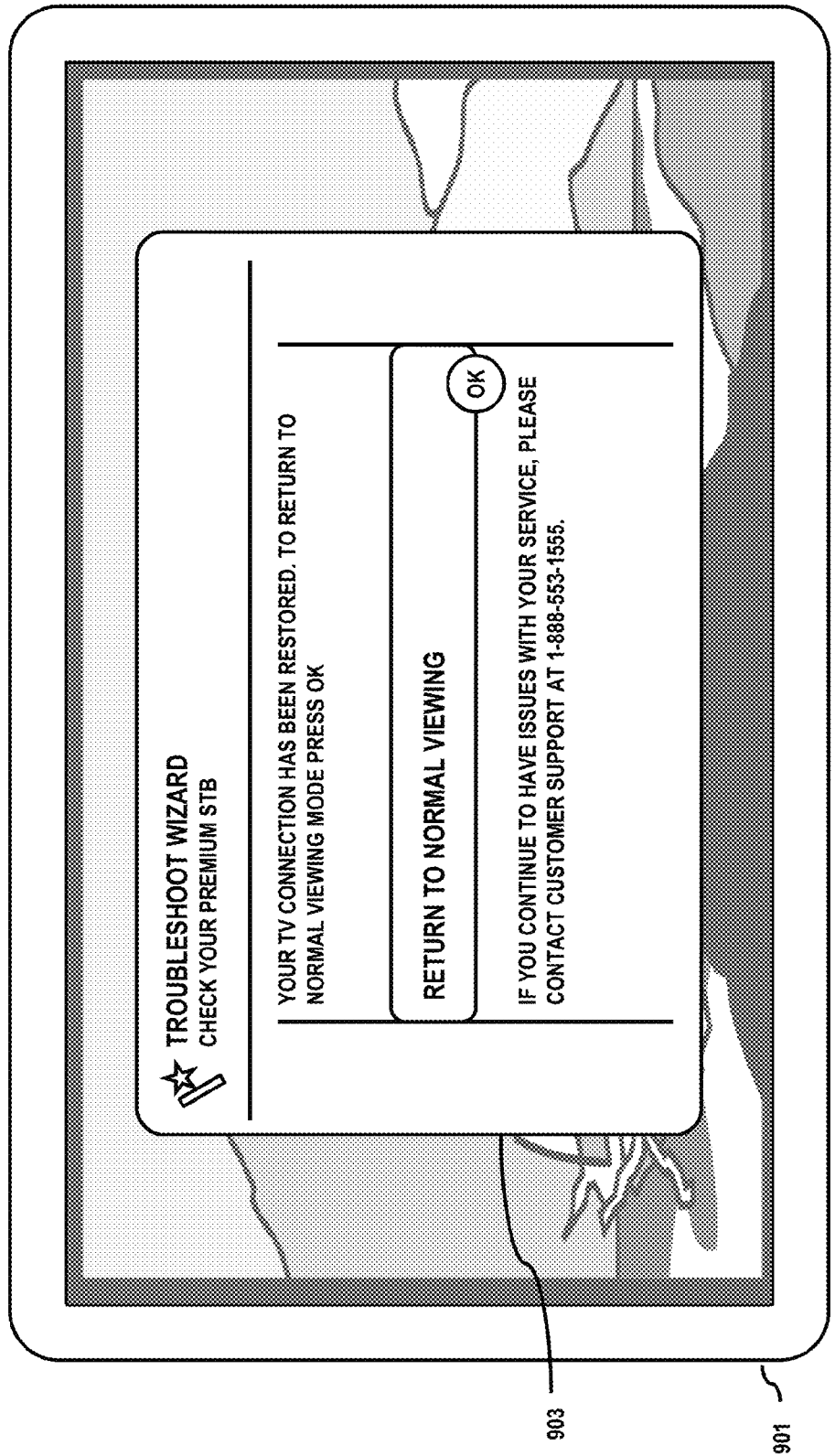
Figure 10:
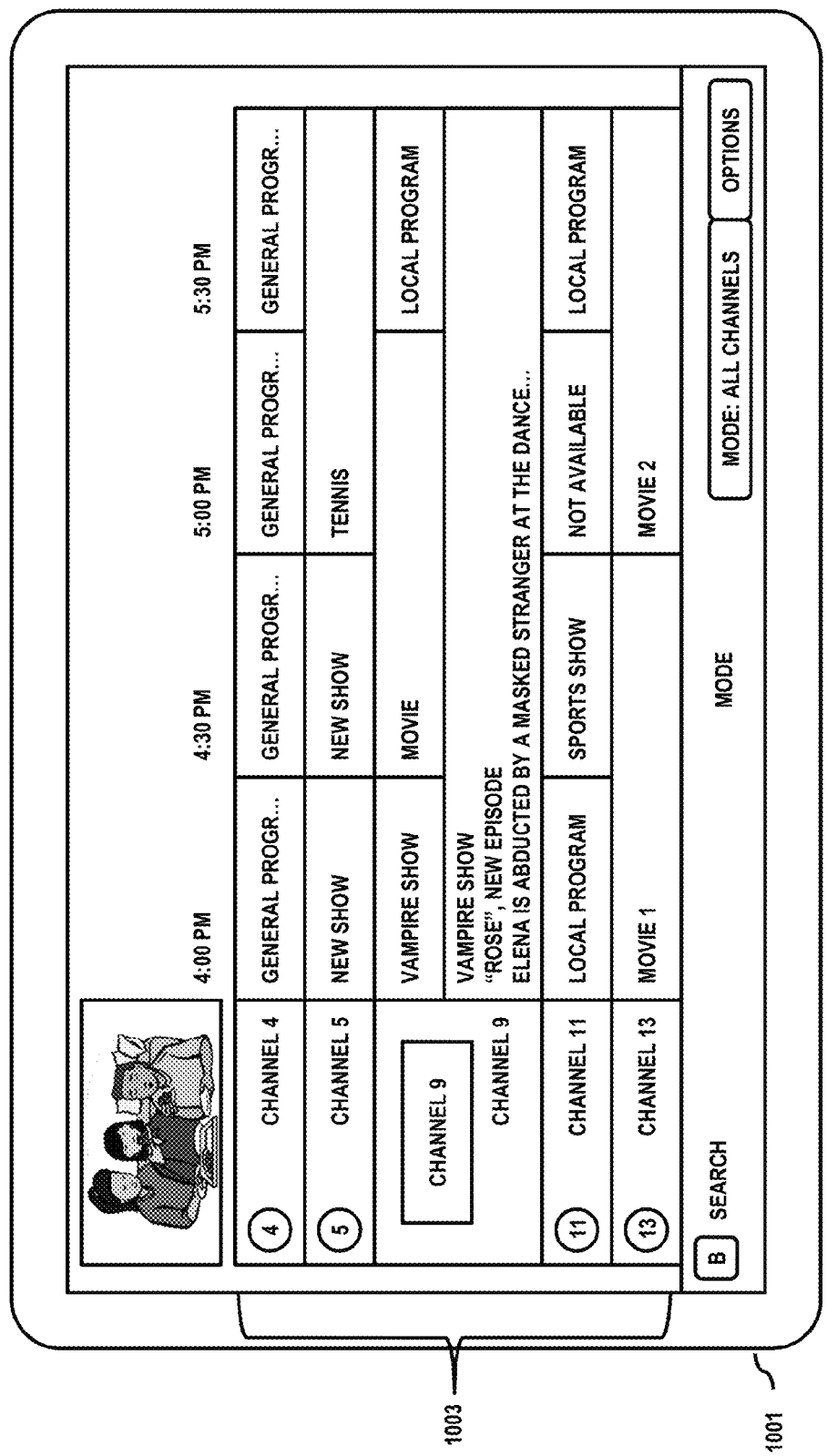

Further, the GUI 600 may notify when a connection has been restored, as illustrated in screen 901 of FIG. 9. The screen 901 includes pane 903 having a selectable option to "return to normal viewing." Upon detecting a selection of the selectable option of pane 903, the EPG guide is updated to include a complete number of channels as shown in FIG. 10. It is contemplated that end-users may have the ability to postpone establishing the media stream, as such processes may result in a temporary delay in a display of content. For instance, some set-top boxes may take a few minutes to establish a media stream, during which no media content is accessible. As shown in FIG. 10, the screen 1001 has channels 1003 that includes additional channels that were inaccessible during the unavailability of media content on media stream.

The processes described herein for providing an improved EPG may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

FIG. 11 is a diagram of a computer system that can be used to implement various exemplary embodiments. The computer system 1100 includes a bus 1101 or other communication mechanism for communicating information and a processor 1103 coupled to the bus 1101 for processing information. The computer system 1100 also includes main memory 1105, such as random access memory (RAM) or other dynamic storage device, coupled to the bus 1101 for storing information and instructions to be executed by the processor 1103. Main memory 1105 also can be used for storing temporary variables or other intermediate information during execution of instructions by the processor 1103. The computer system 1100 may further include a read only memory (ROM) 1107 or other static storage device coupled to the bus 1101 for storing static information and instructions for the processor 1103. A storage device 1109, such as a magnetic disk or optical disk, is coupled to the bus 1101 for persistently storing information and instructions.

The computer system 1100 may be coupled via the bus 1101 to a display 1111, such as a cathode ray tube (CRT), liquid crystal display, active matrix display, or plasma display, for displaying information to a computer user. An input device 1113, such as a keyboard including alphanumeric and other keys, is coupled to the bus 1101 for communicating information and command selections to the processor 1103. Another type of user input device is a cursor control 1115, such as a mouse, a trackball, or cursor direction keys, for communicating direction information and command selections to the processor 1103 and for controlling cursor movement on the display 1111.

According to certain embodiments, the processes described herein are performed by the computer system 1100, in response to the processor 1103 executing an arrangement of instructions contained in main memory 1105. Such instructions can be read into main memory 1105 from another computer-readable medium, such as the storage device 1109. Execution of the arrangement of instructions contained in main memory 1105 causes the processor 1103 to perform the process steps described herein. One or more processors in a multi-processing arrangement may also be employed to execute the instructions contained in main memory 1105. In alternative embodiments, hard-wired circuitry may be used in place of or in combination with software instructions to implement the embodiment of the invention. Thus, embodiments of the invention are not limited to any specific combination of hardware circuitry and software.

The computer system 1100 also includes a communication interface 1117 coupled to bus 1101. The communication interface 1117 provides a two-way data communication coupling to a network link 1119 connected to a local network 1121. For example, the communication interface 1117 may be a digital subscriber line (DSL) card or modem, an integrated services digital network (ISDN) card, a cable modem, a telephone modem, or any other communication interface to provide a data communication connection to a corresponding type of communication line. As another example, communication interface 1117 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1117 sends and receives electrical, electromagnetic, or optical signals that carry digital data streams representing various types of information. Further, the communication interface 1117 can include peripheral interface devices, such as a Universal Serial Bus (USB) interface, a PCMCIA (Personal Computer Memory Card International Association) interface, etc. Although a single communication interface 1117 is depicted in FIG. 11, multiple communication interfaces can also be employed.

The network link 1119 typically provides data communication through one or more networks to other data devices. For example, the network link 1119 may provide a connection through local network 1121 to a host computer 1123, which has connectivity to a network 1125 (e.g. a wide area network (WAN) or the global packet data communication network now commonly referred to as the "Internet") or to data equipment operated by a service provider. The local network 1121 and the network 1125 both use electrical, electromagnetic, or optical signals to convey information and instructions. The signals through the various networks and the signals on the network link 1119 and through the communication interface 1117, which communicate digital data with the computer system 1100, are exemplary forms of carrier waves bearing the information and instructions.

The computer system 1100 can send messages and receive data, including program code, through the network(s), the network link 1119, and the communication interface 1117. In the Internet example, a server (not shown) might transmit requested code belonging to an application program for implementing an embodiment of the invention through the network 1125, the local network 1121 and the communication interface 1117. The processor 1103 may execute the transmitted code while being received and/or store the code in the storage device 1109, or other non-volatile storage for later execution. In this manner, the computer system 1100 may obtain application code in the form of a carrier wave.

The term "computer-readable medium" as used herein refers to any medium that participates in providing instructions to the processor 1103 for execution. Such a medium may take many forms, including but not limited to non-volatile media, volatile media, and transmission media. Non-volatile media include, for example, optical or magnetic disks, such as the storage device 1109. Volatile media include dynamic memory, such as main memory 1105. Transmission media include coaxial cables, copper wire and fiber optics, including the wires that comprise the bus 1101. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 12 is a diagram of a chip set that can be used to implement various exemplary embodiments. Chip set 1200 is programmed to provide an improved EPG as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1200, or a portion thereof, constitutes a means for performing one or more steps of FIGS. 3 and 4.

In one embodiment, the chip set 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to provide an improved EPG. The memory 1205 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:
1. A method comprising:
   determining, by a set-top-box, a number of electronic program guide (EPG) slice files to store in a cache based on a remaining capacity of the cache;
   selecting, by the set-top-box and based on the determined number of the EPG slice files, a time range of EPG data extending from a current time;
   determining an availability, by the set-top box, of a media stream comprising widgets, pay-per-view features, on-demand features, recorded media content, and live media content including a first plurality of programs, indicated in a first one of the EPG slice files, as being accessible to a subscriber according to a subscription and one or more parental settings;
   accessing, based on a determination that the media stream is unavailable, the EPG data, wherein the first one of the EPG slice files indicates a second plurality of programs accessible to the subscriber according to the subscription, the one or more parental settings, and a regional identifier associated with the subscriber, each of the second plurality of programs being accessible to the set-top box via a data stream of a packet-switched network that is separate from the media stream, wherein only the live media content is accessible via the data stream and the second plurality of programs does not include each program of the first plurality of programs, and wherein the widgets, the pay-per-view features, the on-demand features, and the recorded media content are not accessible via the data stream;

appending, to the first one of the EPG slice files, uniform resource locators (URLs) for accessing respective programs of the second plurality of programs via the data stream; and presenting, via a graphical user interface (GUI), scheduling information contained in the EPG data, wherein the scheduling information includes the appended URLs.

2. A method of claim 1, further comprising:

retrieving, via the data stream, live media information for a program of the second plurality of programs.

3. A method of claim 2, wherein the scheduling information includes a URL for retrieving the live media information.

4. A method of claim 2, wherein the scheduling information indicates channel information, the method further comprising:

retrieving, via the data stream, one or more electronic program guides;

determining a channel of an electronic program guide of the one or more electronic program guides based on the channel information; and initiating a presentation of at least a portion of the electronic program guide of the channel.

5. A method of claim 1, wherein at least one of the first plurality of programs includes live media information corresponding with live media information of at least one of the second plurality of programs.

6. A method of claim 1, wherein the scheduling information indicates channel information, the method further comprising:

retrieving, via a video media server, one or more electronic program guides for a plurality of channels of the first plurality of programs; and associating a channel indicated by the channel information with at least a portion of one of the one or more electronic program guides for the first plurality of channels.

7. A method of claim 6, further comprising:

determining whether the cache includes an electronic program guide associated with a second channel indicated by the channel information; and retrieving, via the data stream, an electronic program guide for the second channel based on the determining whether the cache includes an electronic program guide.

8. A method of claim 1, further comprising:

initiating a transmission of one or more of the appended URLs to access one or more of the second plurality of programs.

9. A method of claim 1, further comprising:

determining a restoration of the media stream after presenting the scheduling information; and retrieving, via a video media server, one or more electronic program guides for a plurality of channels of the first plurality of the programs based on the restoration.

10. A method of claim 9, wherein the video media server provides the widgets, the on-demand features, and the pay-per-view features that are accessible per the subscription.

11. An apparatus comprising:

a cache;

a memory, wherein the memory stores instructions; and a processor, wherein the processor executes the instructions to:

determine a number of electronic program guide (EPG) slice files to store in the cache based on a remaining capacity of the cache;

select, based on the determined number of the EPG slice files, a time range of EPG data extending from a current time;

determine an availability of a media stream comprising widgets, pay-per-view features, on-demand features, recorded media content, and live media content including a first plurality of programs, indicated in a first one of the EPG slice files, as being accessible to a subscriber according to a subscription and one or more parental settings;

access, based on a determination that the media stream is unavailable, the EPG data, wherein the first one of the EPG slice files indicates a second plurality of programs accessible to the subscriber according to the subscription, the one or more parental settings, and a regional identifier associated with the subscriber, each of the second plurality of programs being accessible to the apparatus via a data stream of a packet-switched network that is separate from the media stream, wherein only the live media content is accessible via the data stream and the second plurality of programs does not include each program of the first plurality of programs, and wherein the widgets, the pay-per-view features, the on-demand features, and the recorded media content are not accessible via the data stream;

append, to the first one of the EPG slice files, uniform resource locators (URLs) for accessing respective programs of the second plurality of programs via the data stream; and present, via a graphical user interface (GUI), scheduling information contained in the EPG data, wherein the scheduling information includes the appended URLs.

12. An apparatus according to claim 11, wherein the processor further executes the instructions to:

retrieve, via the data stream, live media information for a program of the second plurality of programs.

13. An apparatus according to claim 12, wherein the scheduling information includes a URL for retrieving the live media information.

14. An apparatus according to claim 12, wherein the scheduling information indicates channel information and the processor further executes the instructions to:

retrieve, via the data stream, one or more electronic program guides;

determine a channel of an electronic program guide of the one or more electronic program guides based on the channel information; and initiate a presentation of at least a portion of the electronic program guide of the channel.

15. An apparatus according to claim 11, wherein at least one of the first plurality of programs includes live media information corresponding with live media information of at least one of the second plurality of programs.

16. An apparatus according to claim 11, wherein the scheduling information indicates channel information and the processor further executes the instructions to:

retrieve, via a video media server, one or more electronic program guides for a plurality of channels of the first plurality of programs; and associate a channel indicated by the channel information with at least a portion of one of the one or more electronic program guides for the first plurality of channels.

17. An apparatus according to claim 16, wherein the processor further executes the instructions to:

determine whether the memory includes an electronic program guide associated with a second channel indicated by the channel information; and retrieve, via the data stream, an electronic program guide for the second channel based on the determining whether the memory includes an electronic program guide.

18. A system comprising:

a first content provider to transmit a media stream comprising widgets, pay-per-view features, on-demand features, recorded media content, and live media content including one or more of a first plurality of programs accessible to a subscriber according to a subscription and one or more parental settings;

a second content provider to transmit, via a packet-switched network, a data stream comprising one or more of a second plurality of programs accessible to the subscriber according to the subscription, the one or more parental settings, and a regional identifier associated with the subscriber, wherein only the live media content is accessible via the data stream and the second plurality of programs does not include each program of the first plurality of programs, and wherein the widgets, the pay-per-view features, the on-demand features, and the recorded media content are not accessible via the data stream; and a set-top box to:

determine a number of electronic program guide (EPG) slice files to store in a cache based on a remaining capacity of the cache;

select, based on the determined number of the EPG slice files, a time range of EPG data extending from a current time;

determine an availability of the media stream;

access, based on a determination that the media stream is unavailable, a first one of the EPG slice files that indicates the second plurality of programs;

append, to the first one of the EPG slice files, uniform resource locators (URLs) for accessing respective programs of the second plurality of programs via the data stream; and present, via a graphical user interface (GUI), scheduling information contained in the EPG data, wherein the scheduling information includes the appended URLs.

19. A system according to claim 18, wherein the set-top box is further to:

retrieve, via the data stream, live media information for a program of the second plurality of programs from the second content provider.

20. A system according to claim 19, wherein the time range is up to two weeks.

* * * * *